United States Patent [19]

Glover et al.

[11] Patent Number: 4,822,319

[45] Date of Patent: Apr. 18, 1989

[54] INSTRUMENT DRIVE COUPLER

[75] Inventors: Alfred H. Glover, Decatur; Joseph T. Betterton, Arab, both of Ala.

[73] Assignee: Chrysler Motors Corporation, Highland Park, Mich.

[21] Appl. No.: 135,895

[22] Filed: Dec. 21, 1987

[51] Int. Cl.$^4$ .............................................. F16D 3/50
[52] U.S. Cl. ..................................... 464/101; 464/901
[58] Field of Search ........................... 403/155, 397; 464/87, 92, 100, 101, 147, 153, 901

[56] References Cited

U.S. PATENT DOCUMENTS

| | | | |
|---|---|---|---|
| 1,119,572 | 12/1914 | Butler | 464/153 |
| 1,328,983 | 1/1920 | Coates | 464/153 |
| 1,732,354 | 10/1929 | Cooper | 464/153 |
| 2,246,750 | 6/1941 | Murphy | 464/101 |
| 2,254,486 | 9/1941 | Kauffman, 2nd | 464/153 |
| 2,681,552 | 6/1954 | Olson | 464/153 |
| 2,724,251 | 11/1955 | Weaver | 464/101 |
| 2,903,867 | 9/1959 | Moody | 464/101 |
| 3,340,704 | 9/1967 | Seckerson | 464/101 |

*Primary Examiner*—Daniel P. Stodola
*Attorney, Agent, or Firm*—Kenneth H. MacLean, Jr.

[57] ABSTRACT

A coupler to connect spaced apart ends of a pair of aligned shafts of an odometer assembly, for example, a shaft supporting permanent or total mileage indicating wheels and another shaft supporting trip indicating wheels. The coupler has a generally tubular body with spaced side walls, each side wall having a slot to receive an adjacent shaft end which is configured with a pair of ground flats. The coupler also has an integral catch portion with a movable end portion adopted to pass between the spaced shaft ends when the coupler is inserted over the shaft ends and subsequently to expand outward for preventing removal of the coupler.

1 Claim, 1 Drawing Sheet

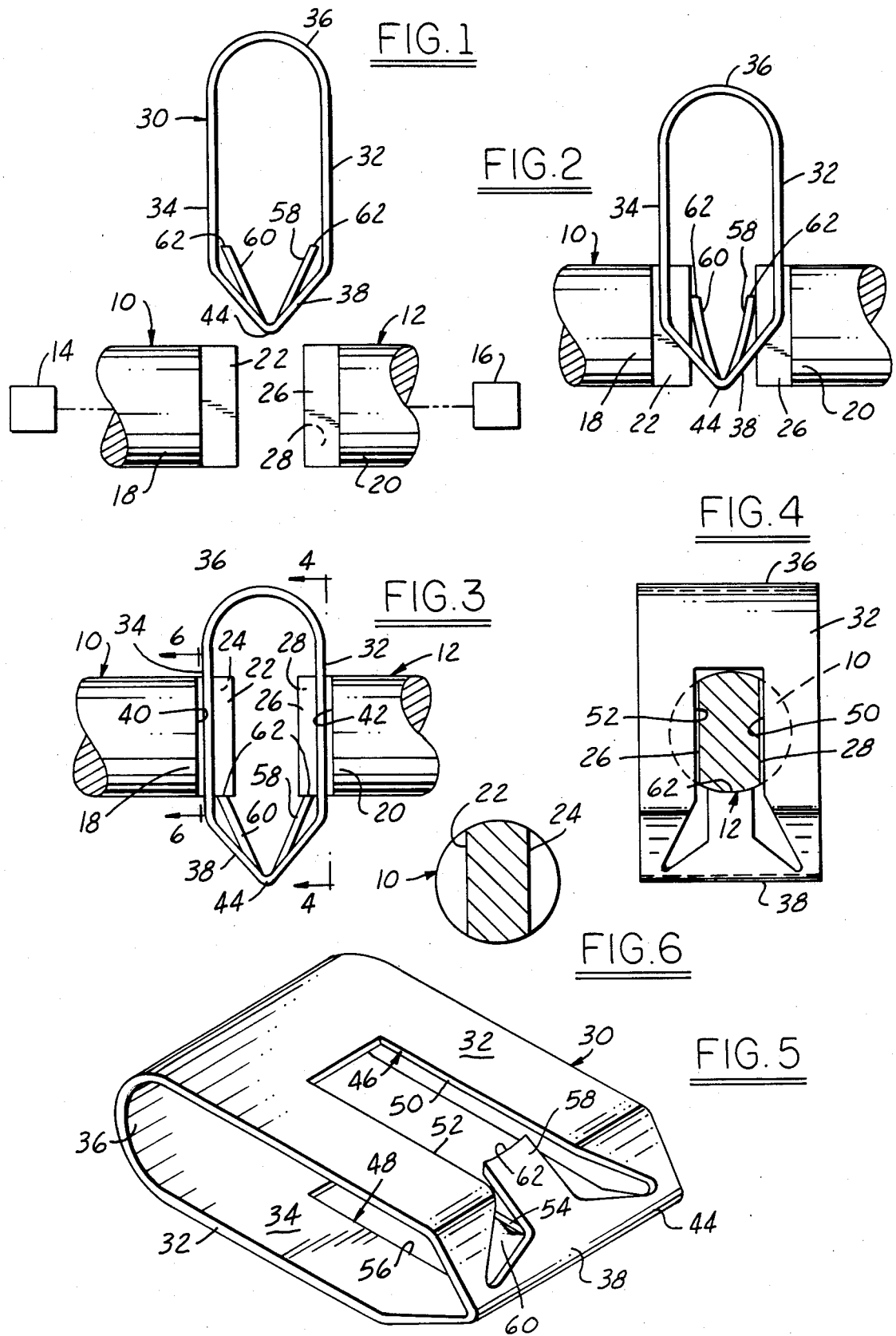

INSTRUMENT DRIVE COUPLER

BACKGROUND OF THE INVENTION

1. Field of the Invention

This application relates to an improved coupler device for connecting the ends of two aligned shafts such as the primary odometer shaft and the trip odometer shaft in a mileage counting and recording assembly of an automobile. The device is adapted to be easily insertable over the shaft ends in a radial direction relative to the shaft. A movable catch-tab portion acts to inhibit removal in the opposite direction.

2. Description of Related Art

In an automobile odometer assembly or any other device having two separate but aligned shafts, it is desirable to connect or couple the shafts for rotation together by a device which can be applied to the shaft ends. The subject device is an improvement over a number of such devices. Specifically, the U.S. Pat. No. 2,724,251 to Weaver discloses a coupler for two shafts which has a slot in one wall to receive a first shaft end and ears defining a gap normal to the first slot. The coupler is inserted over the end of one shaft while the ears are simultaneously moved inward toward the other wall so that the coupler may clear the second shaft.

The U.S. Pat. No. 2,903,867 to Moody also discloses a coupler for connecting two shafts. Like the Weaver patent, the device must be simultaneously inserted over the shaft ends and also squeezed so that the side walls can move between the spaced ends of the two shafts. However, both walls must be moved from their relaxed positions to install the coupler.

The following U.S. patents disclose couplers which require that the shaft ends be inserted into the device and thus require that at least one shaft be moved in the axial direction. This is often undesirable if not impossible.

1,119,572
1,328,983
1,732,354
2,254,486
2,681,552
3,340,704

SUMMARY OF THE INVENTION

This application concerns an improved coupling device for connecting the end portions of two axially aligned shafts such as in some automobile odometers with side-by-side primary and trip odometer rolls. The improved coupler is particularly designed to permit the device to be insertively slipped over the end portions of the shafts in the radial direction of the shafts. Thus, it is unnecessary to axially shift the shafts. Nor is it necessary to simultaneously insert the device and squeeze it so that portions clear the shaft ends.

The subject coupler has a generally tubular base or body with spaced apart side walls and connecting end walls. The side walls each define a slot and they are parallel to one another. The slots partially extend into one of the end walls. The shaft ends are configured with parallel flats and aligned so that during installation of the coupler a surface of one shaft is coplanar with a surface of the other shaft. Likewise, the other surface of one shaft is also coplanar with the other surface of the other shaft. This construction and shaft orientation permits the coupler to be inserted over the shaft ends in a radial direction thereof. At the same time, the slots receive and extend about the flats of the shaft ends.

The one end wall of the coupler supports at least one catch-tab which is integrally connected to the end wall. The catch-tab normally terminates near a side wall at the end of a slot. In this normal or rest position, it engages the shaft after the coupler is installed to inhibit removal of the coupler in the opposite radial direction. However, while the coupler is being installed over and along the shaft ends, the free end of the catch-tab is moved away from the side wall so that it can pass between the spaced ends of the shafts.

Therefore, an object of this invention is to provide an improved coupler for connecting the ends of two shafts including parallel slots in spaced side walls to permit easy insertive assembly of the coupling over the ends of the shafts by application of a radially directed force.

Another object of the invention is to provide such a coupler with a catch-tab portion to secure the coupler in the installed position but which is moved by engagement with a shaft end to a retracted position permitting it to pass by the shaft ends without moving the shafts.

Still further objects and advantages of the subject coupler will be more readily apparent after a reading of the following detailed description of a preferred embodiment, reference being had to the drawings which illustrate the embodiment.

IN THE DRAWING

FIG. 1 is a side view of the coupler in relation to the two shaft ends prior to assembly; and FIG. 2 is a side view of the coupler during insertive assembly over the shaft ends; and FIG. 3 is a side view of the coupler after completion of the assembly to the shaft ends; and FIG. 4 is a sectioned end view of the assembled coupler and shaft taken along section line 4—4 in FIG. 3 and looking in the direction of the arrows; and FIG. 5 is a perspective view of the coupler shown in FIGS. 1–4; and FIG. 6 is a sectioned end view of the assembled coupler and shaft taken along section line 6—6 in FIG. 3 and looking in the direction of the arrows.

DETAILED DESCRIPTION OF A PREFERRED EMBODIMENT

In FIG. 1, two shafts 10 and 12 of an automobile odometer assembly are illustrated. The odometer assembly includes both a total or permanent mileage recorder 14 and a trip mileage recorder 16 which are only shown schematically. Each of the recorders 14 and 16 is of the type utilizing a plurality of wheels rotatively supported on a common shaft. Thus shaft 10 supports the permanent recorder 14 and shaft 12 supports the trip recorder 16. The shafts are axially aligned and mounted on an odometer frame (not shown in the drawings). A drive mechanism (not shown) is operably attached to the shaft 10 to cause the shaft to rotate according to automobile movement. The rotation of shaft 10 produces rotation of the permanent odometer wheels in a manner well known in the odometer art. Likewise, the means of operably driving the shaft 10 is well known.

It is desirable to produce rotation of the other shaft 12 in correspondence to the rotation of the shaft 10. Rotation of the shaft 12 will move the trip odometer wheels in the same manner that the permanent wheels are moved. Accordingly, the end portions 18 and 20 of shafts 10, 12 are formed with flats 22, 24, 26 and 28. The flats 22 and 24 formed on the end of shaft 10 form parallel surfaces as do the flats 26 and 28 on the end of shaft 12. The shafts 10 and 12 are oriented for assembly with pairs of flats 22, 26 and 24 and 28 aligned and coplanar as is illustrated. This permits the subject coupler 30 to be assembled to the shaft ends 18 and 20 by a single and simple insertive movement as will be even clearer by the following explanation.

The coupler 30 has a generally tubular body or configuration. It includes two side wall portions 32 and 34 and two end wall portions 36 and 38. The side walls 32 and 34 are substantially flat and parallel but spaced a predetermined distance apart. The predetermined distance is determined by the spacing between the ends of the shafts 10 and 12 as well as the axial extent of the flats 22–28. As is evident from FIG. 3, the side walls should extend over the flats and preferably extend close to the shoulders 40 and 42. The end wall 36 is curved. The end wall 38 extends obliquely from the side walls 32 and 34 and forms a pointed portion 44. The pointed portion 44 helps guide the coupler to the correct position for insertion during assembly.

Both of the side walls 32 and 34 of the coupler 30 are configured with an elongated slot 46 and 48, respectively. The slots 46 and 48 also extend partially into the end wall 38 and are partially defined by edges 50, 52, 54 and 56. The edges 50–56 engage the shaft flats 22–28 when the coupler is in the assembled position shown in FIGS. 3 and 4.

The coupler also includes two catch-tabs 58 and 60 which are integrally connected to the end wall 38. They extend outward from the pointed portion 44 toward the side walls 32 and 34, respectively. Catch-tabs 58, 60 define end surfaces 62 on an opposite end from the connection with end wall 38. The surface 62 engages the outer surface of the shaft once the coupler is installed as in FIGS. 3 and 4.

The coupler is preferably of tempered steel so that the free ends of the catch-tabs 58 and 60 can move relative to the side walls against the natural resiliency of the steel. Thus the catch-tabs move from the relaxed position shown in FIGS. 1, 3 and 5 to an inwardly flexed position shown in FIG. 2. This movement is produced by an interaction with the spaced end portions 18, 20 of shafts 10 and 12 as the coupler is insertively installed by a radially directed force. This simple installation procedure of the coupling to the shafts is shown in FIGS. 1–3. A stiff and tough plastic material such as nylon or polyethylene is also suitable as are other plastic materials.

From the above description and the drawings, it can be understood that the subject coupler may be easily installed over the end portions of two spaced and aligned shafts without movement of the shafts. The installation requires only a light force on the coupler in a radially inwardly direction with respect to the shaft. Although only one embodiment of the coupler is shown and described in great detail, it is obvious that modifications to the coupler can be made which still fall within the scope of the following claims which define the invention.

We claim:

1. A coupler for installation between the spaced apart ends of two fixed and axially aligned shafts by simple insertion of the coupler over the spaced shaft ends in the shaft's radial direction, each shaft end being configured with parallel flats to define a non-circular cross section with parallel opposite surfaces, one parallel surface of each shaft being coplaner with a corresponding surface of the other shaft, the coupler comprising: a generally tubular base portion having a non-circular cross-sectional shape including a pair of substantially parallel and shaped opposite side walls and first and second ends walls which connect the side walls, the side walls being spaced a greater distance than the space between the shaft ends; each side wall defining an elongated slot partially extending into the first end wall with the slot width being just sufficient to receive a corresponding flat configured shaft end as the coupler is radially inserted over the shaft end, the slots extending parallel to one another whereby opposite side edge portions of a side wall defining the elongated slot engage the parallel surface to form a driving connection between each shaft and t he coupler; an elongated catch-tab formed integrally with the one end wall and extending both toward the other end wall and outward toward one of the side walls when is an unstressed condition, the catch-tab terminating at a free end unattached to adjacent portions of the side wall and thus independently movable with respect the side wall portions forming the slot and thus capable of movement under stress in a direction generally normal to the plane of the side wall as is caused by interaction with a shaft end portion as the coupler is inserted in a radial direct ion over the shaft end whereafter the free end of the catch-tab returns to its unstressed position by the movement of the shaft end past the free end which allows the free end to move outward toward the side wall and engage the shaft thereby securing the coupler to the shaft and preventing unintended disassembly of the coupler from the shaft.

* * * * *